United States Patent
Vosburgh

(10) Patent No.: US 7,089,533 B2
(45) Date of Patent: Aug. 8, 2006

(54) METHOD AND SYSTEM FOR MAPPING BETWEEN MARKUP LANGUAGE DOCUMENT AND AN OBJECT MODEL

(75) Inventor: Brian Vosburgh, Durham, NC (US)

(73) Assignee: OIC Acquisition I Corp, Redwood Shores, CA (US)

( * ) Notice: Subject to any disclaimer, the term of this patent is extended or adjusted under 35 U.S.C. 154(b) by 398 days.

(21) Appl. No.: 09/920,786

(22) Filed: Aug. 1, 2001

(65) Prior Publication Data

US 2004/0205552 A1   Oct. 14, 2004

(51) Int. Cl.
   *G06F 9/44*   (2006.01)
(52) U.S. Cl. .................. 717/123; 717/101; 717/104
(58) Field of Classification Search ........ 717/104–123, 717/136–137, 141–144, 101–102; 707/4–6, 707/100–102, 103 R, 103 Y, 103 X, 103 Z, 707/104.1; 715/509–524, 900–902, 907–911
   See application file for complete search history.

(56) References Cited

U.S. PATENT DOCUMENTS

| | | | |
|---|---|---|---|
| 5,499,371 A | 3/1996 | Henninger et al. | |
| 5,615,362 A | 3/1997 | Jensen et al. | |
| 5,706,506 A | 1/1998 | Jensen et al. | |
| 5,801,689 A * | 9/1998 | Huntsman | 345/733 |
| 5,857,197 A | 1/1999 | Mullins | 707/103 |
| 6,078,926 A | 6/2000 | Jensen et al. | 707/103 |

OTHER PUBLICATIONS

Rundensteiner et al., "Maintaining Data Warehouses Over Changing Information Sources", ACM, pp. 57-62, Jun. 2000.*
Bukhres et al., "Effective Standard for Metadata in GCMD data Access System", IEEE, pp. 155-161, 2000.*

* cited by examiner

*Primary Examiner*—Ted T. Vo
(74) *Attorney, Agent, or Firm*—Park, Vaughan & Fleming LLP

(57) ABSTRACT

Mapping operations between a markup language document and an object model are executed in response to a request from a client application. The mapping operations include a read, write, update, or delete operation. To map the markup language document to the object model, mapping meta-data is used, which contains information as to how the markup language element maps to an attribute and/or a relationship of the object model.

53 Claims, 11 Drawing Sheets

METHOD AND SYSTEM FOR MAPPING BETWEEN MARKUP LANGUAGE DOCUMENT AND AN OBJECT MODEL

This invention relates to the field of markup language and object models and, more specifically, to a method and a system for mapping data in a markup language document to an object model and for mapping an object in an object model to a markup language document document.

BACKGROUND OF THE INVENTION

XML (extensible Markup Language) defines a standard language-independent textual format for representing data. On the other hand, object-oriented languages such as Java™ (a trademark of Sun Microsystems), as well as other object-oriented languages such as those offered by Microsoft and Hewlett-Packard, represent data through objects and object models. An application object model or business object model represents an application's data through modelling the real-world domain objects of the application.

Using XML data in an object-oriented application through an application object model would be advantageous. However, the formats of XML data and object-oriented language are distinct. XML represents data as a plain text document composed of a series of elements in a hierarchical format whereas objects in an object-oriented application are composed of a rich set of data-types, pointers, application rules/methods, inheritance and relationships to other objects.

XML parsers, such as Xerces™ (a trademark of Apache), provide a prior solution for reading in and parsing XML data into Java. However, XML parsers only provide a mechanism for reading and parsing XML data into Java. For example, Simple API for XML (SAX) based parsers only produce a series of parse events. Document Object Model (DOM) based parsers only produce a parse tree representation of the data. These parsers do not provide application object models or provide support for inheritance or relationships in the object model.

It is therefore desirable to provide a method and system for mapping data in a markup language document to an object model as well as for mapping an object in an object model to a markup language document.

SUMMARY OF THE INVENTION

It is an object of the present invention to overcome one or more of the problems cited above.

It is an object of the invention to provide a method and system for mapping between markup language document and an object model.

The present invention uses mapping meta-data that defines how the data architecture of a markup language document maps to the object model system for mapping between the XML document and the object model In accordance with an aspect of the present invention, there is provided a method for mapping data in a markup language document to an object model. The method comprises the steps of receiving a mapping request for mapping data in a markup language document having data architecture into an object model, and mapping, in response to the mapping request, the data into the object model using mapping meta-data which defines how the data architecture of the markup language document maps to the object model.

In accordance with another aspect of the present invention, there is provided a method for mapping an object in an object model to a markup language document. The method comprises the steps of receiving a mapping request for mapping one or more objects of an object model into a markup language document having data architecture and mapping, in response to the mapping request, the objects into the markup language document using mapping meta-data which defines how the object model maps to the data architecture of the markup language document.

In accordance with another aspect of the present invention, there is provided a mapping manager for mapping between a markup language document and an object model. The mapping manager comprises an executor for receiving a mapping request for mapping between a markup language document having data architecture and an object model, and a mapping executor for mapping, in response to the mapping request, between data of the markup language document and objects of the object model using mapping meta-data which defines how the data architecture of the markup language document maps to the object model. I In accordance with an aspect of the present invention, there is provided a mapping system for mapping between a markup language document and an object model. The mapping system comprises an executor for receiving a mapping request for mapping between a markup language document having data architecture and an object model, a storage for storing mapping meta-data which defines how the data architecture of the markup language document maps to the object model, and a mapping executor for mapping, in response to the mapping request, between data of the markup language document and an object of the object model using the mapping meta-data.

Other aspects and features of the present invention will be readily apparent to those skilled in the art from a review of the following detailed description of preferred embodiments in conjunction with the accompanying drawings.

BRIEF DESCRIPTION OF THE DRAWINGS

The invention will be further understood from the following description with reference to the drawings in which.

DETAILED DESCRIPTION OF THE PREFERRED EMBODIMENTS

The present invention relates to mapping between a markup language document and an object model. A markup language document includes elements that are defined by tags, labels or similar indicators. The markup language may be XML, Standard Generalized Markup Language (SGML), Hyper Text Markup Language (HTML), Extensible HTML (XHTML). The following embodiments will be described using XML as an exemplary of the markup language. However, the applicability of the invention is not limited to XML or XML based technologies. An XML document has both a logical and a physical structure. Logically, the XML document is composed of declarations, elements, comments, character references, and processing instructions. The elements can contain text and other elements. XML documents are given a "key" that uniquely identifies each XML document. Attributes in XML provide additional information regarding an element.

Embodiments of the present invention will be described using an XML file system which enables one to manipulate XML files, i.e., read, write, delete and update XML files.

An object model, such as Java, contains one or more object classes. An object class contains attributes, relationships and/or methods. The attributes store primitive data such as integers, and also store simple types, such as String and Date. Relationships are references to other classes. The methods are paths of query execution. However, the applicability of the invention is not limited to Java or Java based technologies.

Figure 4:
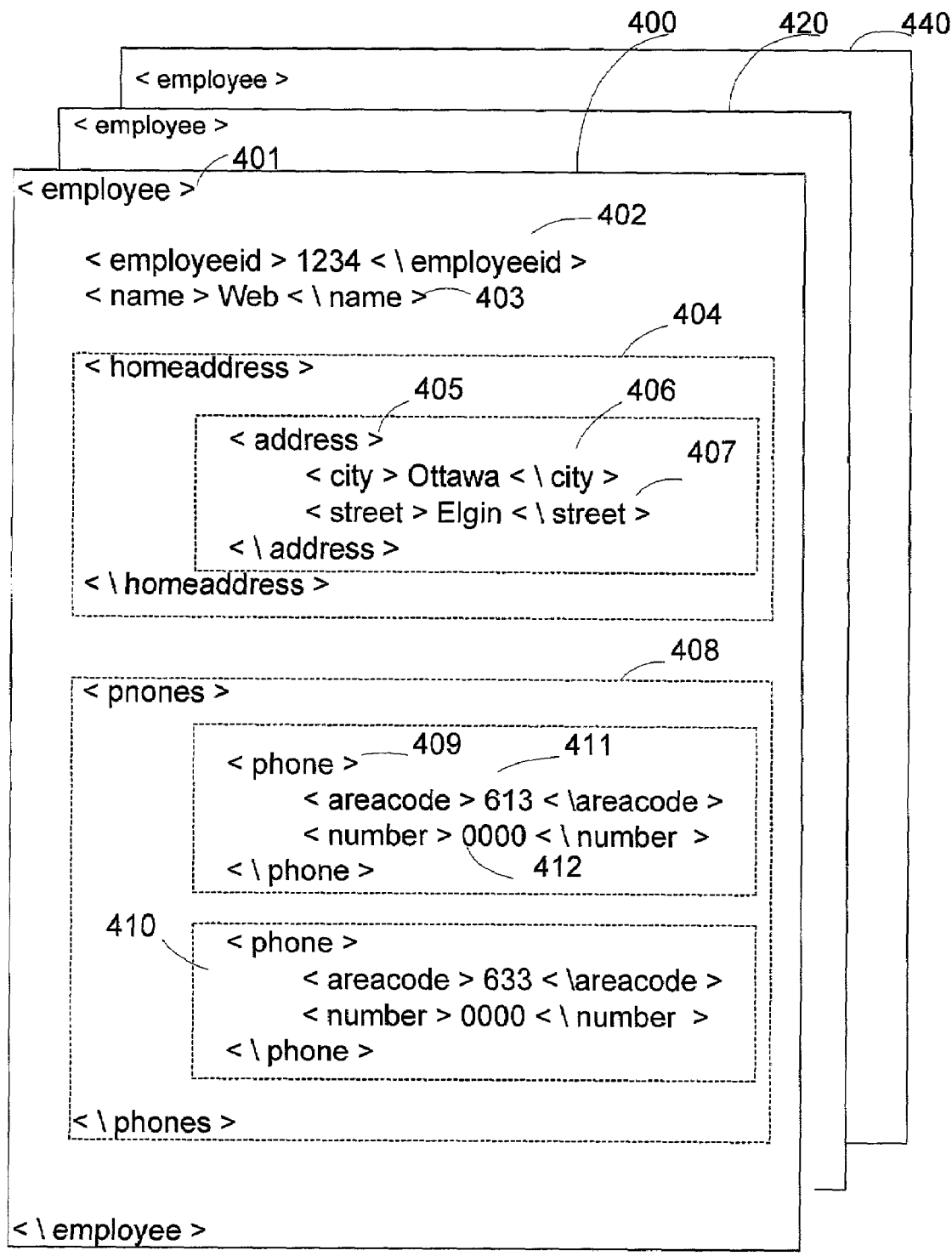
FIG. 4 is a diagram showing an example of an XML file 400.

FIG. 4 shows an example of XML files, each of which includes data of a single employee. In FIG. 4 a plurality of XML files 400, 420 and 440 are shown. Each XML file contains the element employee. Each of XML files 400, 420 and 440 contains data of a single employee including his/her employee identification (id), name, home address and one or more phone numbers.

For example, the XML file 400 contains an employee element 401. The employee 401 contains four elements, employeeid 402, name 403, homeaddress 404, and phones 408. The data of the employeeid 402 shows that the employee's identification is "1234". Each employee has unique identification. Thus, the data of the employeeid 402 is a key that can uniquely identify the XML file 400.

The homeaddress 404 contains one element, address 405. The address 405 contains two elements, city 406 and street 407. The phones 408 contains two elements, phone 409 and 410. Each of the phone 409 and 410 contains two elements, areacode 411 and number 412.

The employee 401 and the homeaddress 404 have a one to one relationship and the elements which construct the homeaddress 404 are contained within the employee 401. This relationship is referred to as an aggregate one-to-one relationship.

The employee 401 and the phones 408 have a one to many relationship and the elements which construct a collection of the phone 409, 410 are contained within the employee 401. The relationship between the employee 401 and the phones 408 is referred to as an aggregate one-to-many collection relationship.

If the homeaddress 404 contains a key to identify another XML file which contains address data, the employee 401 and the homeaddress 404 have a one-to-one relationship.

If each of the phone 409 and the phone 410 has its own key to identify another XML file which contains a collection of phone data, the employee 401 and the phones 408 have a one-to-many relationship.

Figure 5:
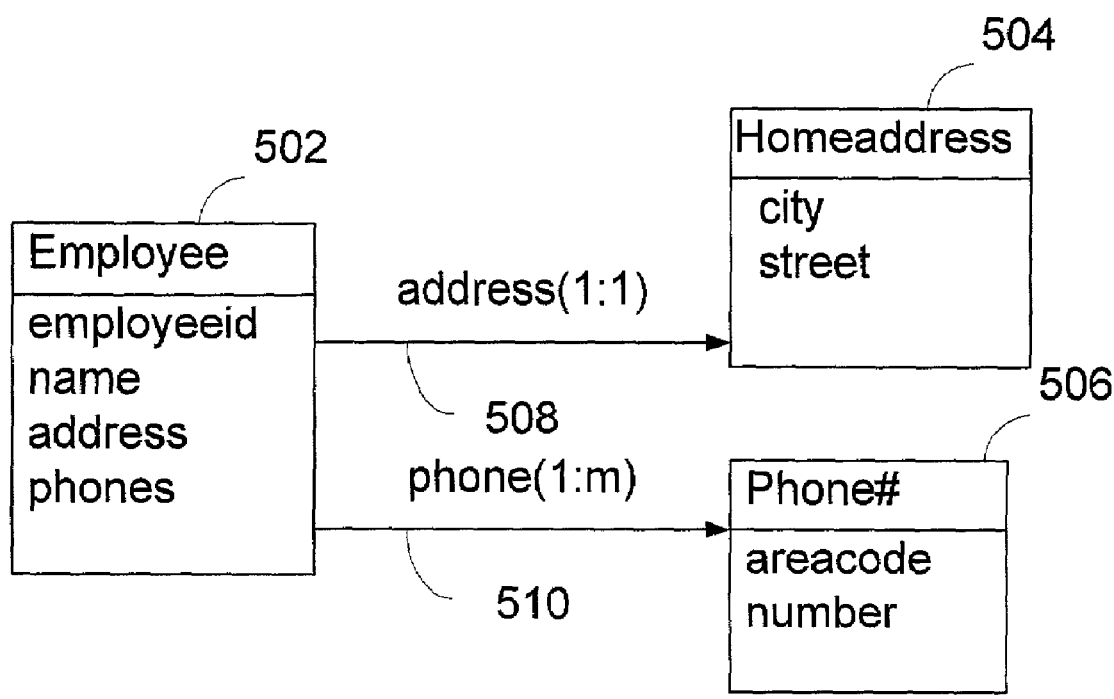
FIG. 5 is a diagram showing an example of an object model to which an XML file 400 maps.

FIG. 5 shows an example of object classes of an object model 500 to which the XML files 400, 420, 440 map. The object model 500 contains three object classes, Employee 502, Homeddress 504, and Phone# 506. The Employee 502 has a primary key employeeid.

Employee 502 has a homeaddress attribute, the value of which references to a homeaddress object in Homeaddress 504.

Homeaddress 504 contains attributes, city and street. Phone# 506 contains the attributes, areacode and number.

The employee 401, homeaddress 404, and phone 409–410 correspond to Employee 502, Homeaddress 504 and Phone# 506, respectively.

Homeaddress 504 depends on Employee 502, and does not have a key that is used to identify a homeaddress object in Homeaddress 504. Employee 502 and Homeddress 504 have an aggregate one-to-one relationship. This relationship is shown in arrow 508

Phone# 506 depends on Employee 502, and does not have a key that is used to identify a phone object in Phone# 506. Employee 502 and Phone# 506 have an aggregate one-to-many collection relationship. This relationship is shown in arrow 510

If the employee 401 and the homeaddress 404 have a one-to-one relationship, Homeaddress 504 has a key to identify the homeaddress object of Homeaddress 504, and thus Employee 502 and Homeddress 504 have a one-to-one relationship.

If the employee 401 and the phones 408 have a one-to-many relationship, Phone# 506 has a key to identify the phone object, and Employee 502 and Phone# 506 have a one-to-many relationship.

Figure 1:
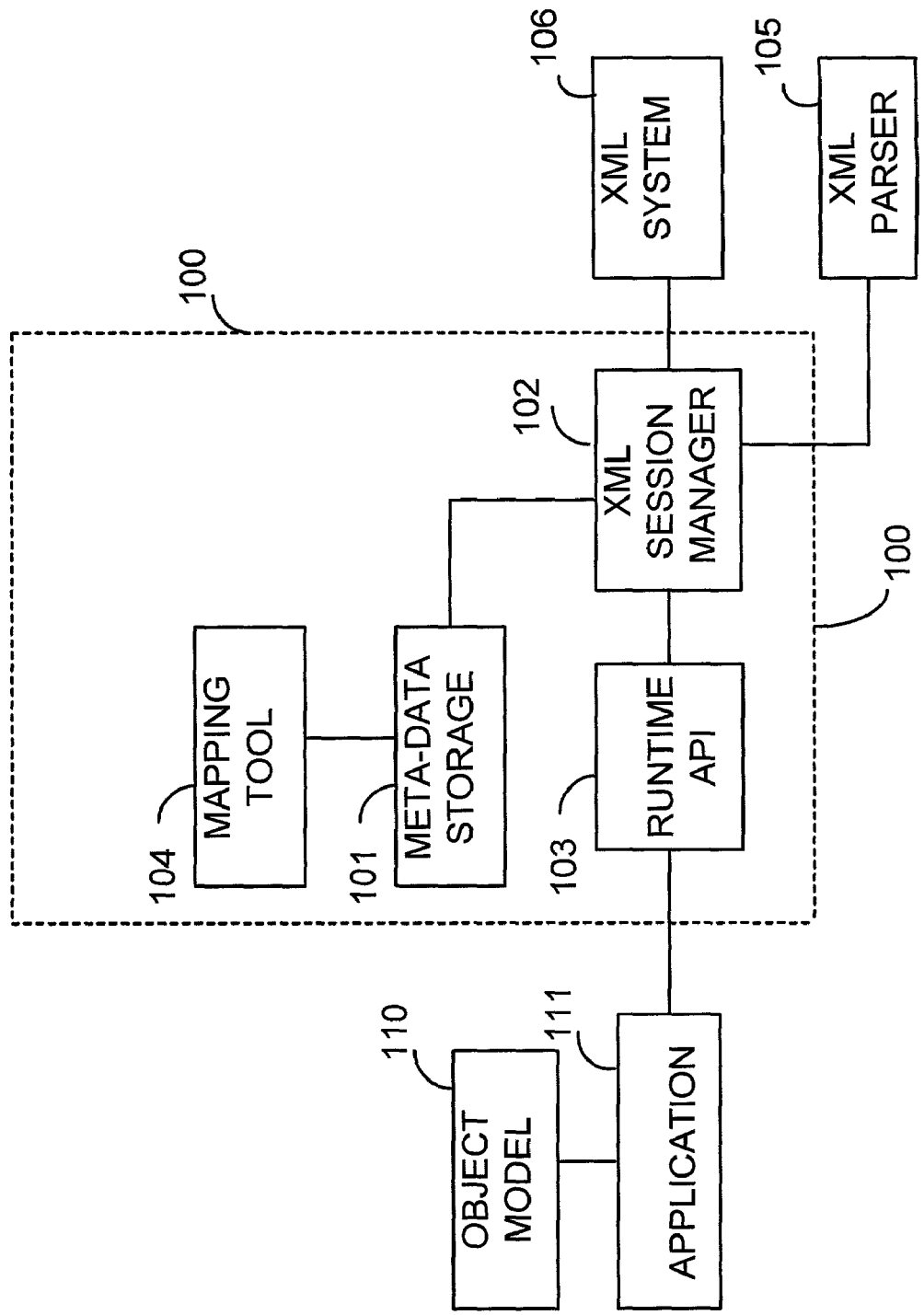
FIG. 1 is a block diagram showing an example of a mapping system to which an XML session manager in accordance with an embodiment of the present invention is applied.

FIG. 1 shows an example of a mapping system 100 to which an XML session manager in accordance with an embodiment of the present invention is applied. The mapping system 100 comprises a meta-data storage 101, an XML session manager 102, a runtime Application Programming Interface (API) 103 and an architecture mapping tool 104.

The XML session manager 102 maps XML files to an object model 110 of the application 111 and vice versa using mapping meta-data that defines how XML files map to the object model.

Using the exemplary XML file 400 illustrated in FIG. 4 and the exemplary object model 500 illustrated in FIG. 5, mapping meta-data will be described. The mapping meta-data defines how one or more elements in XML files map to the attributes and relationships in an object model.

(1) The mapping meta-data defines the XML element and the corresponding object class.

For example, the mapping meta-data includes information that Employee 502, Homeaddress 504 and Phone# 506 correspond to employee 401, homeaddress 404 and phones 408, respectively.

(2) The mapping meta-data defines the attribute of the object class and the corresponding XML element.

For example, the mapping meta-data defines that the attributes of Employee 502, employeeid, name, address, phones correspond to employeeid 402 of employee 401, name 403, homeaddress 404, phones 408. Similarly, the city attribute of Homeaddress 504 corresponds to city 406 of homeaddress 404, and the areacode attribute of Phone# 506 corresponds to areacode 411 of phones 408 and so on.

(3) The mapping meta-data may define the type of relationship that is represented by the attribute and its corresponding element if the attribute is a relationship.

The types of relationship may include a one-to-one, a one-to-many, an aggregate one-to-one, and an aggregate one-to-many collection relationship.

For example, mapping meta-data includes information that employee 401 and homeaddress 404 have an aggregate one-to-one relationship and Employee 502 and Homeddress 504 have an aggregate one-to-one relationship.

(4) For relationships, the mapping meta-data may define the referenced class and the XML elements used to define the relationship.

If the attribute is a relationship, the object class of the attribute is specified. This is one of the classes mapped by the mapping system 100. For one-to-one and one-to-many relationships, meta-data indicates which elements in this (source) class's XML document are used to construct a "key" to the other (target) class's XML document. For aggregate one-to-one and aggregate one-to-many collection relationships, this information is not needed as referenced classes depend on parent classes.

(5) the mapping meta-data may have information regarding any transformations or conversion that should be applied to the XML data to convert it to the type of the object class. This information is used when the attribute is a simple attribute, such as a string, number or date, This information is being read from the XML file and the application object model does not provide enough information to the mapping system 100 to successfully perform the mapping. For example, in Java, an object may have an attribute that is declared of type "Number". "Number" has a number of subclasses: Integer, Longer, Float.

The mapping system could generate any of these types from the XML data and put it in the corresponding object. However, in some cases, the developer may want to specify the exact type to be placed in the object. The mapping system allows the developer to specify the extract type to be placed in the object.

(6) The mapping meta-data may define the XML elements that defined the type of the object class, if the class is involved in inheritance.

Referring back to FIG. 1, the mapping meta-data storage 101 stores mapping meta-data, described above. As described above, mapping meta-data defines the relation between the architecture of an XML file and the architecture of an object model 110 of a client application 111.

The XML session manager 102 is a runtime component to manage an XML session object. The XML session object represents the application's point of contact into an XML system 106. The XML session object implements an XML session. The XML session includes mapping operations, such as read operations, write operations, delete operations and/or update operations.

The XML session manager 102 manipulates objects or XML files to execute mapping operations.

In the read operation, the XML session manager 102 reads an XML file into the object model 110. In the write operation, the XML session manager 102 writes one or more objects of the object model into the corresponding one or more XML files.

When an object is changed in the object model, the update operation is executed. The XML session manager 102 updates the changes to the corresponding elements in one or more XML files. When an object is deleted from the object model, the delete operation is executed, The XML session manager 102 deletes the corresponding XML element or elements from the XML file.

Once the XML session is initialized, the XML session manager 102 executes the mapping operation using mapping meta-data. The functions of the XML session manager 102 are further describes in more detail below.

The client application 111 initializes the XML session by calling one or more methods implemented by the XML session object. When the XML session is initialized, the mapping meta-data is loaded to the XML session manager 102 from the mapping meta-data storage 101.

The runtime API 103 is an interface to link the client application 111 and the XML session manager 102. The runtime API 103 defines the XML session object.

The architecture mapping tool 104 is a tool that assists users in generating the mapping meta-data. Preferably, the mapping tool 104 has a graphical user interface (GUI). The mapping meta-data may be captured through an XML document that describes the mapping meta-data, or through an object model that represents the mapping meta-data. Further, the mapping meta-data may be specified through manually editing the XML file, or though application programming interface code.

The XML system 106 is a system that is able to manipulate XML data. It may be a file system that is capable of reading and writing. The XML system 106 may reside on the local hard drive, or on a server on a computer network, e.g., the Internet. In this embodiment, the XML system 106 is described as an XML file system containing XML files.

The XML parser 105 may be used to read the XML files.

Figure 2:
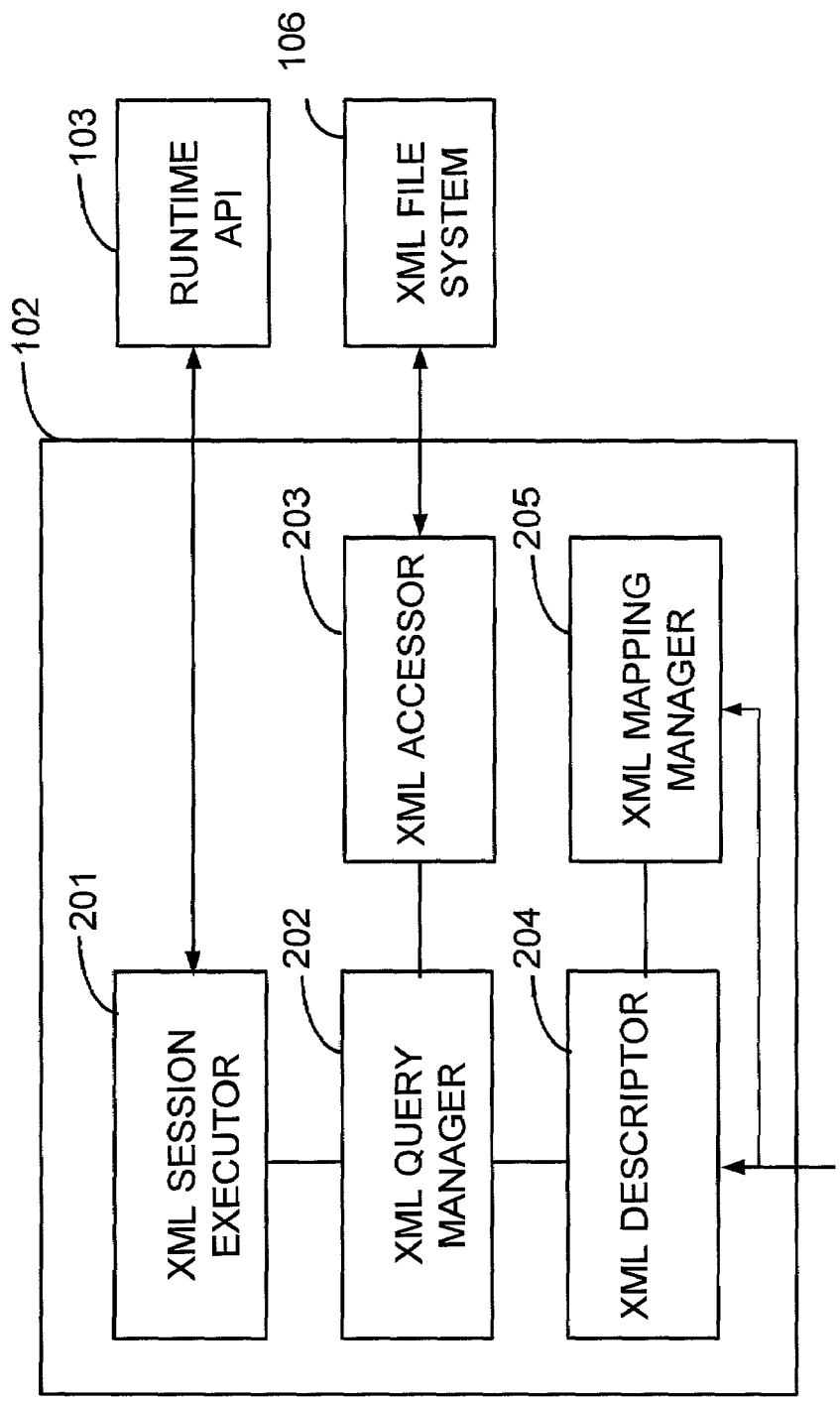
FIG. 2 is a block diagram showing an example of an XML session manager.

FIG. 2 shows a diagram of the XML session manager 102. The XML session manager 102 includes an XML session executor 201, an XML query manager 202, an XML accessor 203, an XML descriptor 204 and an XML mapping manager 205.

The XML session executor 201 is a runtime component to execute mapping operations. The XML query manager 202 is a runtime component to manage queries to the XML file system 106. The XML accessor 203 is a component to access an XML system. When the XML accessor 203 receives an XML file, the XML accessor 203 generates a row structure, such as a Hashtable or mapping table. An example of the row structure is shown in FIG. 6.

Figure 6:
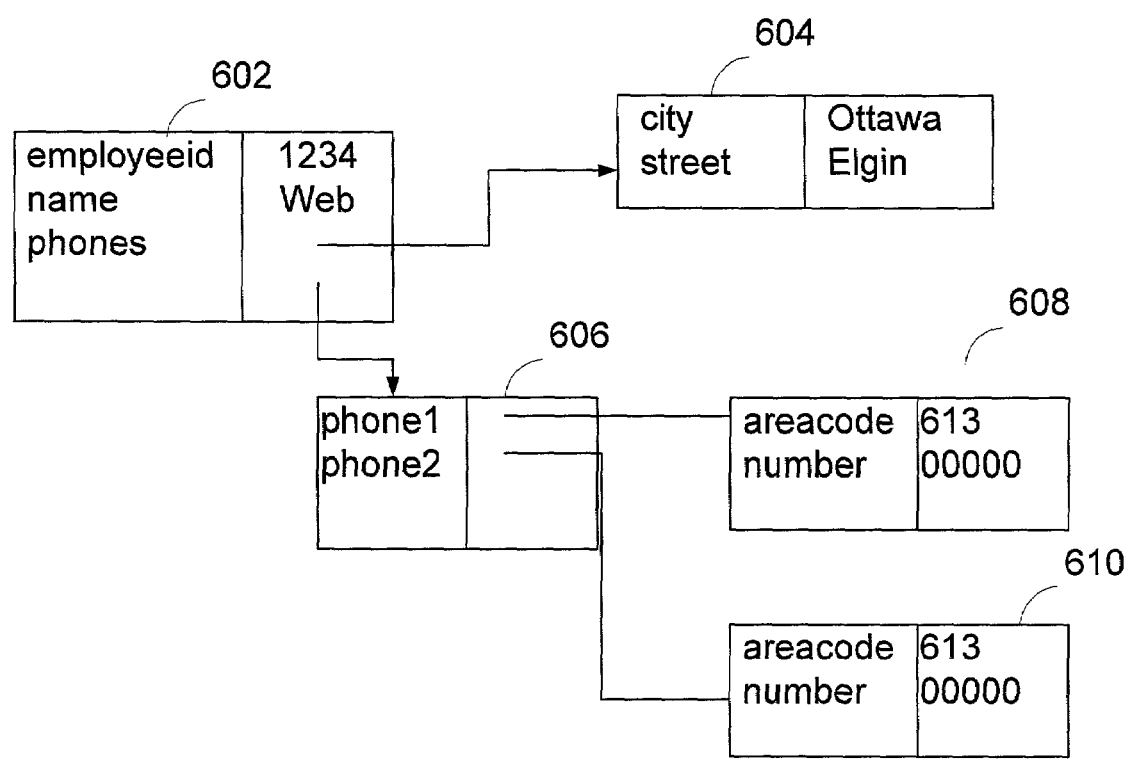
FIG. 6 is a diagram showing an example of row structure associated with an XML file 400.

FIG. 6 shows an example of the row structure generated for the XML file 400. Employee 602 has four rows, employee, name, address and phones. The address of Employee 602 points to Address 604. Address 604 has two attributes, city and street. The phones of Employee 602 points to PhoneNo 606. PhoneNo 606 has two attributes, phone1 and phone2. The phone1 of PhoneNo 606 points to Phone 608. The phone2 of PhoneNo 606 points to Phone 610. Each of Phone 608 and 610 has two attributes, areacode and number.

Referring back to FIG. 2, the XML descriptor 204 and the XML mapping manager 205 stores the mapping meta-data during the XML session. The XML descriptor 204 is a set of properties and mappings that describes how the object data is represented in an XML file. The XML descriptor 204 contains mappings from the class attribute to the XML element, as well as the transformation routines necessary for storing and retrieving attributes. The XML descriptor 204 acts as the link between the object model and the XML file system 106.

Figure 3:
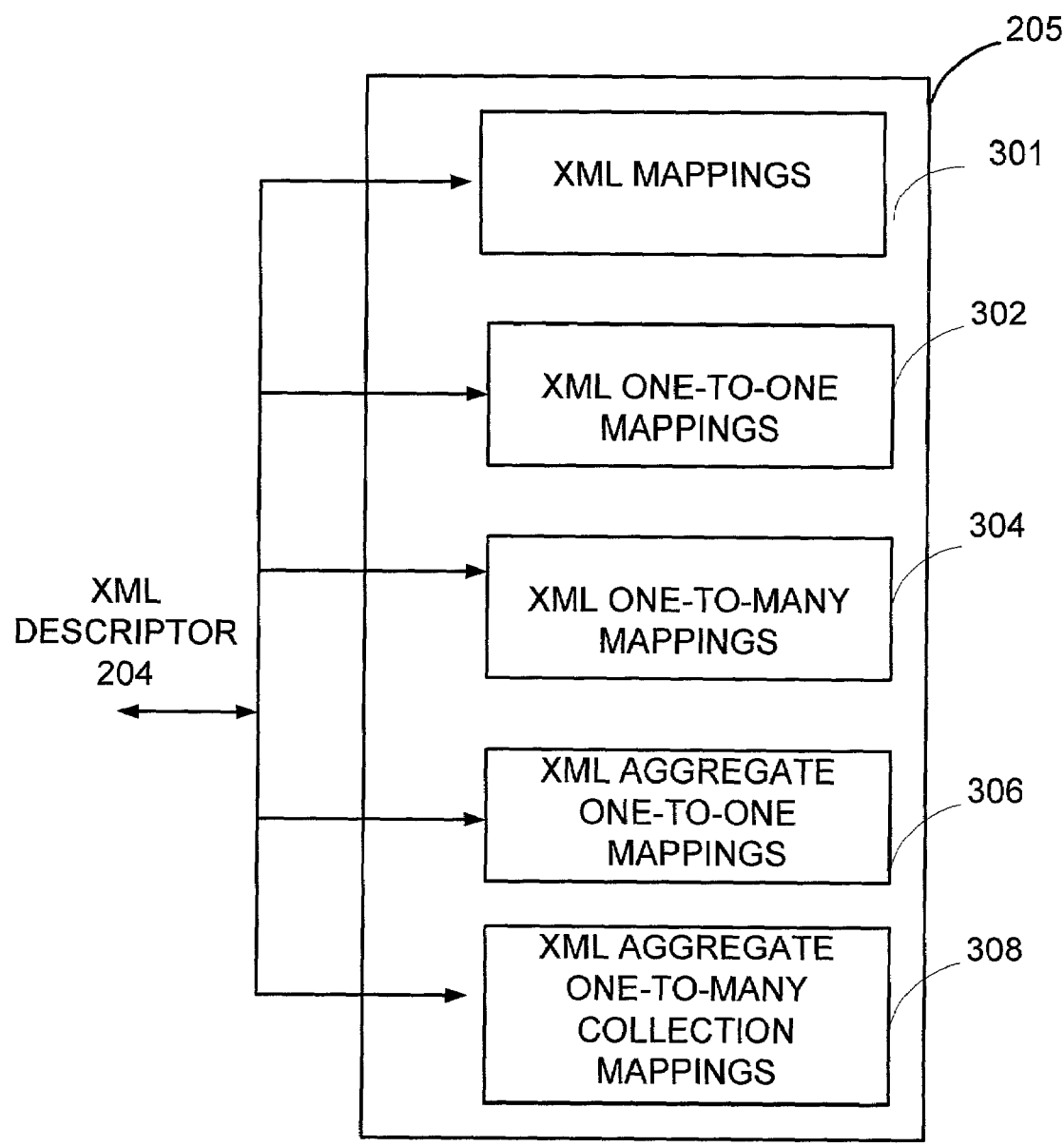
FIG. 3 is a block diagram showing an example of an XML mapping manager.

The XML mapping manager 205 accomplishes the storage and retrieval of an object's attributes in and from the XML representation. As shown in FIG. 3, the XML mapping manager 205 may include XML mappings 301, XML one-to-one mappings 302, XML one-to-many mappings 304, XML aggregate one-to-one mappings 306, and XML aggregate one-to-many collection mappings 308, when such relationships exist in the object model 110.

The XML mappings 301 handle the mapping between an object class and an XML element. The XML mappings 301 also handle the mapping between an attribute of an object class and an XML element.

The XML one-to-one mappings 302 handle the mapping of one-to-one relationships. The XML one-to-many mappings 304 handle the mapping of one-to-many relationships. The XML aggregate one-to-one mappings 306 handle the mapping of aggregate one-to-one relationships. The XML aggregate one-to-many collection mappings 308 handle the mapping of aggregation one-to-many collection relationships.

Figure 10:
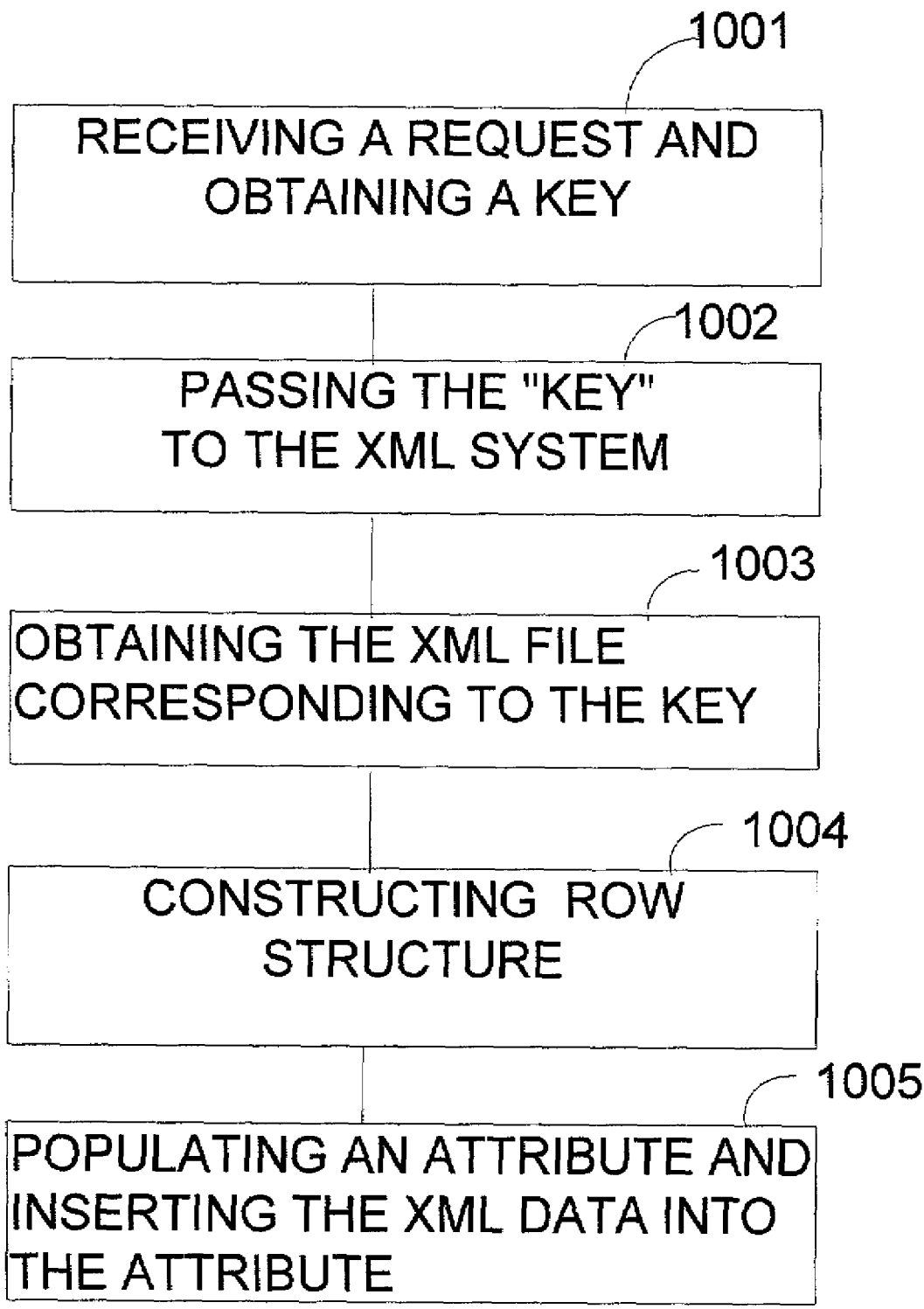
FIG. 10 is a flowchart showing an example of an operation of a mapping system.

The following is one example of mapping operations. Referring to FIG. 10, the client application 111 requests the XML session manager 102 to read an object such as "CUSTOMER" object whose CUSTOMER NUMBER is "5551212" (step 1001). "5551212" is a key to uniquely identify the CUSTOMER object.

The key is passed to the XML file system 106 (step 1002). The XML file system 106 returns the XML file identified by this key to the XML session manager 102 (step 1003). This XML file contains the data corresponding to the CUSTOMER object with CUSTOMER NUMBER "5551212".

The XML session manager 102 takes the XML file and constructs the appropriate CUSTOMER object (step 1004). More specifically, row structure corresponding to CUSTOMER is constructed. The XML descriptor 204 populates attributes with XML data. The data obtained from the XML file is inserted into the attributes as described in meta-data (step 1005). As a result, the object of CUSTOMER is outputted and passed to the client application 111.

Figure 11:
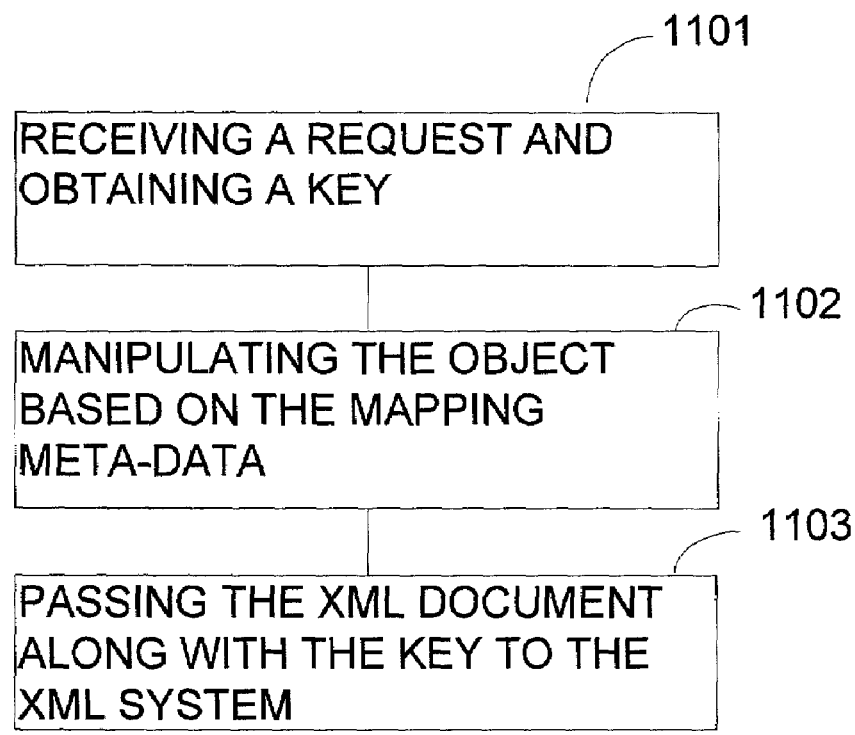
FIG. 11 is a flowchart showing an example of an operation of a mapping system.

Referring to FIG. 11, the client application 111 requests the XML session manager 102 to write CUSTOMER object whose CUSTOMER NUMBER is "5551212" (step 1101). As mentioned above, this CUSTOMER object has been defined in the object model 110 of the client application 111. The XML session uses the mapping meta-data that has been defined to map the CUSTOMER object and its attributes to an XML file for manipulate the object (step 1102). The mapping system 100 passes the corresponding XML document, along with its "key" (5551212), to the XML file system 106 (step 1103).

Figure 7:
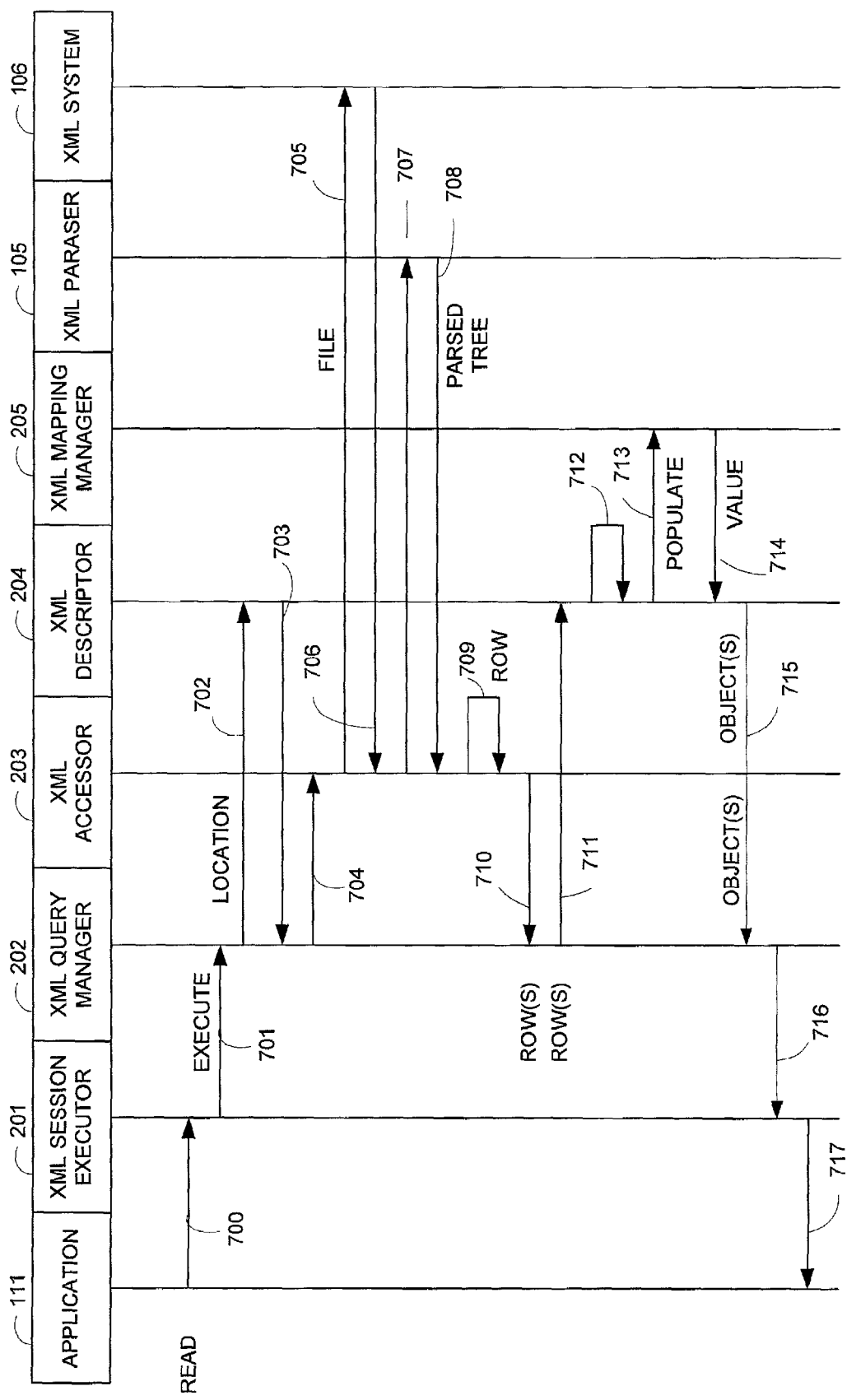
FIG. 7 is a diagram showing an example of a read operation.

FIG. 7 shows a diagram showing an example of the read operation. The client application 111 generates a request for reading employee data identified by employeeid "1234" into the object model 110 from the XML file system 106. The employeeid "1234" is a key to uniquely identify the XML file 400 shown in FIG. 4. The mapping meta-data has been loaded to the XML descriptor 204 and the XML mapping manager 205.

In step 700, the application 111 requests the XML session manager 102 through the runtime API 103 (FIG. 1) to read the XML file 400. The XML session executor 201 generates a read request to execute the read operation and forwards the request to the XML query manager 202 (step 701).

In step 702, the XML query manager 202 queries the XML descriptor 204 the location of the XML file 400. The XML descriptor 204 uses the key to find the location of the XML file 400 and returns the location of the XML file 400 to the XML query manager 202 (step 703).

The XML query manager 202 forwards the location of the XML file 400 to the XML accessor 203 (step 704). The XML accessor 203 accesses the XML file system 106 to get the XML file (step 705). The XML file system 106 returns to the XML accessor 203 the XML file 400 (step 706).

The XML session manager 201 may use the XML parser 105 to read the XML file 400. When the XML parser 105 is used, the XML accessor 203 passes the XML files 400 to the XML parser 105 (step 707). The XML parser 105 returns a parsed tree structure of the XML file 400 to the XML accessor 203 (step 708). The XML accessor 203 generates row structure (FIG. 6) of the XML file 400 based on the parse tree (step 709).

The XML accessor 203 forwards the rows of the generated row structure to the XML query manager 202 (step 710). The XML query manager 202 forwards these rows to the XML descriptor 204 (step 711).

The XML descriptor 204 converts the rows into one or more objects (step 712). The XML descriptor 204 then populates one or more attributes of the created objects (step 713). The XML mapping manager 205 takes the value of each attributes and forwards it to the XML descriptor 204 (step 714).

The XML descriptor 204 receives values and enters values to the attributes, and passes them to the XML query manager 202(step 715). The XML query manager 202 then passes these objects to the XML session manager 201 (step 716). The client application 111 obtains the objects associated with the XML file 400 whose employeeid is "1234" (step 717).

Figure 9:
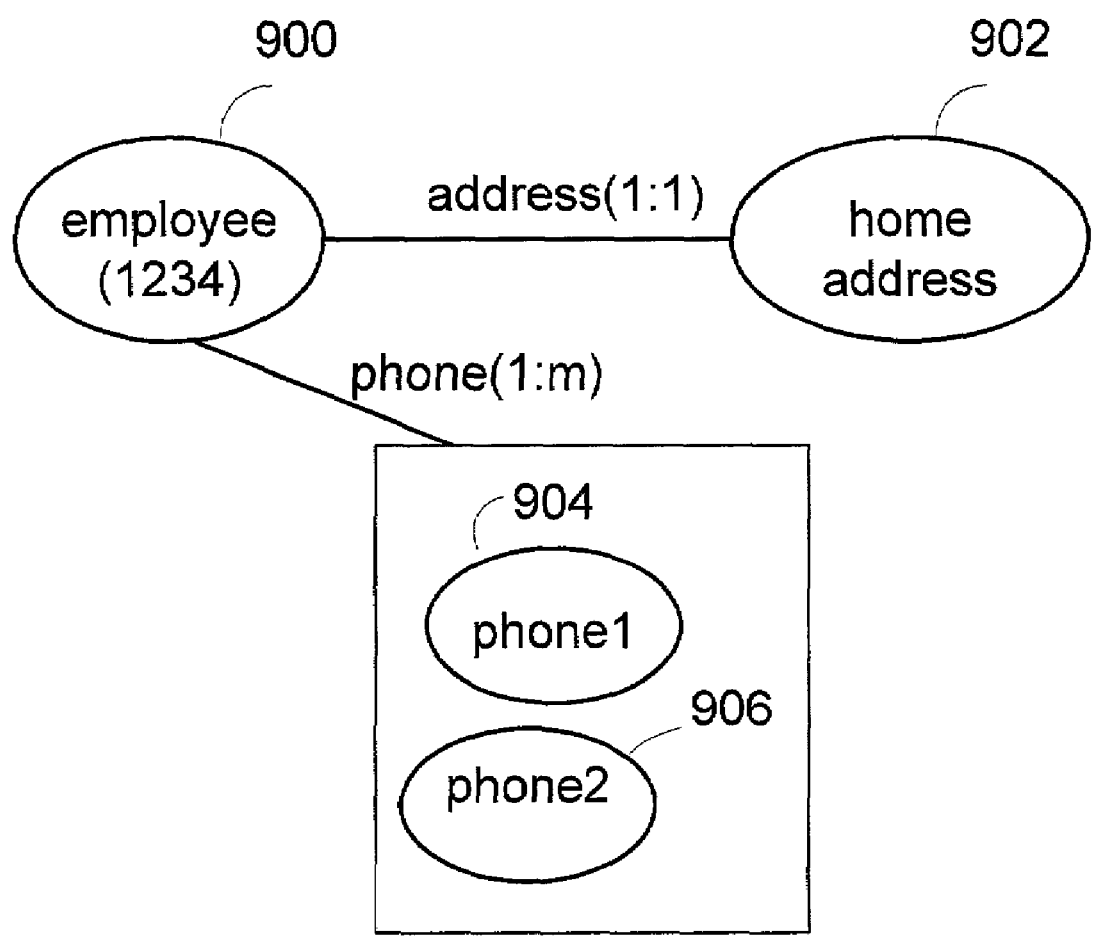
FIG. 9 is a pictorial diagram showing objects associated with XML file 400.

The resultant objects are shown in FIG. 9. The objects include the four objects, employee 900, homeaddress 902, phone1 904 and phone2 906.The employee 900 has its unique key, employeeid "1234".

The employee 900 corresponds to the employee 401. The homeaddress 902 corresponds to homeaddress 404. The phone1 904 corresponds to the phone 409 and the phone2 906 corresponds to the phone 410.

Figure 8:
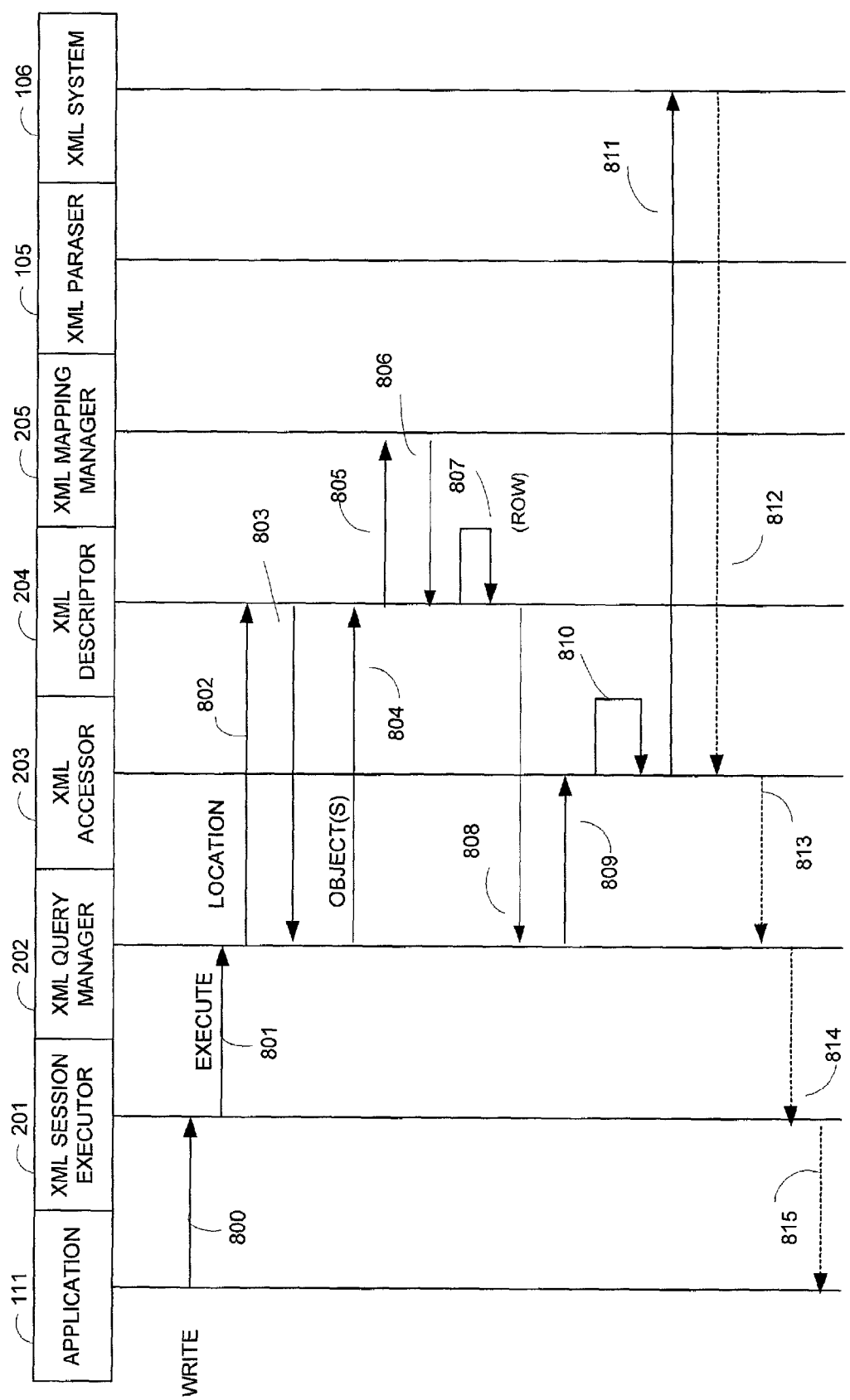
FIG. 8 is a diagram showing an example of a write operation.

FIG. 8 shows a diagram of an example of the write operation. The client application 111 generates a request for writing into the XML file 400 objects 900 relating to an employee in the object model 500 shown in FIG. 9. The employee is identified by employeeid "1234".

In step 800, the application 111 requests the XML session manager 102 through the runtime API (FIG. 1) to write the objects 900 of the object model 500. The XML session executor 201 generates a write request to execute the write operation and forwards it to the XML query manager 202 (step 801).

In step 802, the XML query manager 202 queries to the XML descriptor 204 the location where the resultant XML file 400 is to be stored. The XML descriptor 204 uses the key to find the location and returns the location to the XML query manager 202 (step 803).

The XML query manager 202 forwards the objects 900 along with the location to the XML accessor 203 (step 804). The XML descriptor 204 takes a value of each attribute and forwards it to the XML mapping manager 205 (step 805). The XML mapping manager 205 describes the relationship and forwards it to the XML descriptor 204 (step 806).

The XML descriptor 204 creates row structure based on the mapping meta-data (step 807). The XML descriptor 204 forwards the row structure to the XML query manager 202 (step 808). The XML query manager 202 passes the row structure to the XML accessor 203 together with the location (step 809). The XML accessor 203 creates XML file 400 based on the row structure (step S810), and write it into the XML system 106 (step 811).

The XML system 106 may return to the client application 111 an acknowledgement or an error message through the XML accessor 203 (step 812), the XML query manager 202 (step 813) and the XML session executor 201 (step 814) (step 815).

The update operation is executed through the similar process to the write operation. When an object is changed in the object model 110, the XML session executor 201 generates an update request to update the corresponding elements in the XML files.

The delete operation is executed thorough the similar process to the write operation. When an object is deleted from the object model, the XML session executor 201 generates a delete request to delete the corresponding elements in the XML files.

The meta-data storage 101 may be an XML file system. When the mapping meta-data is stored in XML files, the mapping system 100 may read the mapping meta-data into the XML descriptor 204 and the XML mapping manager 205 using a similar system as the XML session manager 120 as described above.

The following is another example showing mapping of a one-to-one relationship. A Project object has an attribute named "manager" that represents a one-to-one relationship to a ProjectManager object. To map this relationship, the client application 111 indicates the Employee Number element as the "key" for the XML document that will be used to build the ProjectManager.

The mapping meta-data for the attribute "manager" indicates;
(1) the attribute to be mapped, "manager";
(2) the reference object is ProjectManager; and
(3) which elements in the Project's XML document should be used to construct a "key" to the ProjectManager's XML document.

For example, the ProjectManagerEmployeeNumber element corresponds to the ProjectManager's EmployeeNumber element.

When reading in an XML document for a Project object, the mapping system 100 takes the value in the ProjectManagerEmployeeNumber element and uses it to create a "key" to pass to the XML system 106. The XML system 106 returns the XML document corresponding to the appropriate element. The mapping system 100 then uses this XML document to build the ProjectManager object and places it into the Project's "manager" attribute.

When writing a Project object into an XML document in the XML system 106, the mapping system 100 takes the ProjectManager object currently in the Project's "manager" attribute and calculates the "key" using the mapping meta-data for mapping ProjectManagerEmployeeNumber element.

According to the present invention, the XML data can be read into an object model and inheritance or relationships can be supported. Users can make use of XML data in an object-oriented application through an application object model. Also, the object model can be written into XML data.

The XML session manager of the present invention may be implemented by any hardware, software or a combination of hardware and software having the above described functions. The software code, either in its entirety or a part thereof, may be stored in a computer readable memory.

The above embodiments are described using XML as an example of a markup language. However, the applicability of the invention is not limited to XML or XML based technologies. The invention may be applied to other markup languages and technologies with or without appropriate modification as necessary or desired, and such application is within the scope of the invention.

Also, the above embodiments are described using Java technology as an example of an object based technology and language. However, the applicability of the invention is not limited to Java or Java based technologies. The invention may be applied to other object-based languages and technologies, such as those developed by Microsoft Corporation or Hewlett Packard, with or without appropriate modification as necessary or desired, and such application is within the scope of the invention.

Further, a computer data signal representing the software code which may be embedded in a carrier wave may be transmitted via a communication network. Such a computer readable memory and a computer data signal are also within the scope of the present invention, as well as the hardware, software and the combination thereof.

While particular embodiments of the present invention have been shown and described, changes and modifications may be made to such embodiments without departing from the true scope of the invention.

What is claimed is:

1. A method for mapping between a markup language document and an object model, the method comprising the steps of;
    receiving a mapping request for mapping between a markup language document and an object model, wherein the mapping request includes a key for identifying the markup language document, wherein the mapping between the markup language document and the object model includes:
        mapping data in the markup language document having data architecture into an object model; and
        mapping one or more objects in an object model into a markup language document;
    mapping, in response to the mapping request, either the data directly into the object model, or the objects directly into the markup language document, using mapping meta-data which defines how the data architecture of the markup language document maps to the object model, wherein the mapping step obtains the markup language document using the key;
    wherein mapping the data in the markup language document directly into the object model using the mapping meta-data enables the method to support inheritance or relationships in the object model.

2. The method as claimed in claim 1, wherein the markup language document has one or more elements containing data, the object model has one or more object classes, each object class has one or more attributes that correspond to the elements, and the step of mapping includes a step of populating the attributes with the data of the corresponding elements based on the mapping meta-data.

3. The method as claimed in claim 1, wherein the markup language document has one or more elements containing data, the object model has one or more object classes, each object class has one or more attributes that correspond to the elements and the step of mapping includes;
    a step of generating a row structure corresponding to the markup language elements of the markup language document;
    a step of converting the row structure into one or more objects corresponding to the elements; and
    a step of populating attributes of the converted objects with the data of the elements based on the mapping meta-data.

4. The method as claimed in claim 2, wherein the markup language document further has at least one element containing one or more other elements and the mapping step inserts, based on the mapping meta-data, a value representing the relation between the at least one element and the one or more other elements into an attribute of the object model to represent a relationship between objects corresponding to the at least one element and the one or more other elements.

5. The method as claimed in claim 4, wherein the at least one element contains a single element containing data and the mapping step inserts a value representing the relation between the at least one element and the single element into an attribute of the object model that represents a one-to-one relationship between objects that correspond to the at least one element and the single element.

6. The method as claimed in claim 4, wherein the at least one element contains a single element containing a pointer to another element in a different markup language document and the mapping step inserts a value representing the relation between the at least one element and the single element into an attribute of the object model that represents an aggregate one-to-one relationship between objects that correspond to the at least one element and the single element.

7. The method as claimed in claim 4, wherein the at least one element contains multiple elements containing data and the mapping step inserts values representing the relation between the at least one element and the multiple elements into attributes of the object model that represent one-to-many relationships between objects that correspond to the at least one element and the multiple elements.

8. The method as claimed in claim 4, wherein the at least one element contains multiple elements containing pointers to elements in one or more different markup language documents and the mapping step inserts values representing the relation between the at least one element and the multiple elements into attributes of the object model that represent aggregate one-to-many relationships between objects that correspond to the at least one element and the multiple elements.

9. The method as claimed in claim 1 further comprising a step of obtaining the mapping meta-data prior to the mapping step.

10. The method as claimed in claim 9, wherein the obtaining step is carried out during initialization of a system for executing the receiving step and the mapping step.

11. The method as claimed in claim 1, wherein the markup language document has one or more elements, the object model has one or more object classes, and the mapping meta-data includes mapping information regarding one of the elements and the corresponding object class.

12. The method as claimed in claim 1, wherein the markup language document has one or more elements, the object model has one or more object classes, each object class has one or more attributes, the mapping meta-data includes mapping information regarding one of the elements that contains data and the corresponding attribute, and the mapping step maps the data of the one of the elements into the corresponding attributes based on the mapping information.

13. The method as claimed in claim 1, wherein the markup language document is a document in which each element is defined by indicators.

14. The method as claimed in claim 13, wherein the markup language document is an eXtensible Markup Language (XML) document.

15. The method as claimed in claim 1, wherein the object model has one or more object classes containing the one or more objects to be mapped, each object class has one or more attributes, and the step of the mapping includes a step of creating one or more elements of the markup language document corresponding to the one or more objects by inserting values of the attributes into the elements based on the mapping meta-data.

16. The method as claimed in claim 1, wherein the object model has one or more object classes containing one or more objects to be mapped, each object class has one or more attributes, and the step of mapping includes:

a step of generating a row structure corresponding to the one or more objects based on the mapping meta-data; and a step of creating elements of the markup language document based on the row structure.

17. The method as claimed in claim 15, wherein the attributes include an attribute representing a relationship between the objects and the mapping step maps a value representing the relationship between the elements.

18. The method as claimed in claim 17, wherein an attribute represents a one-to-one relationship between a source object and a target object and the mapping step maps a value representing the one-to-one relationship to an element containing another element for containing data that corresponds to data of the target object.

19. The method as claimed in claim 17, wherein an attribute represents an aggregate one-to-one relationship between a source object and a target object and the mapping step maps a value representing the aggregate one-to-one relationship to an element containing another element for containing a pointer to point to another element in a different markup language document that contains data corresponding to data of the target object.

20. The method as claimed in claim 17, wherein an attribute represents a one-to-many relationship between a source object and multiple target objects and the mapping step maps values representing the one-to-many relationship to an element containing multiple other elements for containing data that correspond to data of the multiple target objects.

21. The method as claimed in claim 17, wherein an attribute represents an aggregate one-to-many relationship between a source object and multiple target objects and the mapping step maps values representing the aggregate one-to-many relationship to an element containing multiple other elements for containing pointers to points other elements in one or more different markup language documents that contain data corresponding to data of the target objects.

22. The method as claimed in claim 1 further comprising a step of obtaining the mapping meta-data prior to the mapping step.

23. The method as claimed in claim 22, wherein the obtaining step is carried out during initialization of a system for executing the receiving step and the mapping step.

24. The method as claimed in claim 1, wherein the markup language document has one or more elements, the object model has one or more object classes, and the mapping meta-data includes information regarding the object class and the corresponding one of the elements.

25. The method as claimed in claim 1, wherein the markup language document has one or more elements, the object model has one or more object classes, the object class has one or more attributes, and the mapping meta-data includes information regarding one of the attributes and the corresponding one of the elements.

26. The method as claimed in claim 1, wherein the markup language document is a document in which each element is defined by indicators.

27. The method as claimed in claim 26, wherein the markup language document is a XML document.

28. A mapping manager for mapping between a markup language document and an object model, the mapping manager comprising:
   an executor for receiving a mapping request for mapping between a markup language document having data architecture and an object model, wherein the mapping request includes a key for identifying the markup language document; and
   a mapping executor for directly mapping, in response to the mapping request, between data of the markup language document and objects of the object model using mapping meta-data which defines how the data architecture of the markup language document maps to the object model, wherein the mapping step obtains the markup language document using the key;
   wherein mapping the data in the markup language document directly into the object model using the mapping meta-data enables the mapping executor to support inheritance or relationships in the object model.

29. The manager as claimed in claim 28, wherein the markup language document has one or more elements, the object model has one or more object classes, each object class has one or more attributes, and the mapping executor includes a mapping unit for populating the attributes with the data of the elements based on the mapping meta-data.

30. The manager as claimed in claim 28, wherein the markup language document has one or more elements, the object model has one or more object classes, each object class has one or more attributes, and the mapping executor includes:
   a generator for generating a row structure corresponding to the markup language elements;
   a converter for converting one or more objects based on the row structure; and
   a mapping unit for populating attributes of the converted objects with the data of the elements based on the mapping meta-data.

31. The manager as claimed in claim 29, wherein the markup language document further has at least one element containing one or more other elements, and the mapping unit inserts, based on the mapping meta-data, a value representing the relation between the at least one element and the one or more other elements into an attribute of the object model to represent a relationship between objects corresponding to the at least one element and the one or more other elements.

32. The manager as claimed in claim 31, wherein the at least one element contains a single element containing data and the mapping unit inserts a value representing a relation between the at least one element and the single element into an attribute of the object model that represents a one-to-one relationship between objects that corresponds to the at least one element and the single element.

33. The manager as claimed in claim 31, wherein the at least one element contains a single element containing a pointer to another element in a different markup language document, and the mapping unit inserts a value representing the relation between the at least one element and the single element into an attribute of the object model that represents an aggregate one-to-one relationship between objects that corresponds to the at least one element and the single element.

34. The manager as claimed in claim 31, wherein the at least one element contains multiple elements containing data, and the mapping unit inserts values representing the relation between the at least one element and the multiple elements into attributes of the object model that represent one-to-many relationships between objects that corresponds to the at least one element and the multiple elements.

35. The manager as claimed in claim 31, wherein the at least one element contains multiple elements containing pointers to elements in one or more different markup language documents, and the mapping unit inserts values representing the relation between the at least one element and the multiple elements into attributes of the object model that represent aggregate one-to-many relationships between objects that correspond to the at least one element and the multiple elements.

36. The manager as claimed in claim 28, wherein the mapping executor includes a mapping unit for obtaining the mapping meta-data.

37. The manager as claimed in claim 28, wherein the markup language document has one or more elements, the object model has one or more object classes, and the mapping executor includes a mapping unit for handling a mapping between one of the elements and the corresponding object class.

38. The manager as claimed in claim 28, wherein the markup language document has one or more elements, the object model has one or more object classes, each object class has one or more attributes, and the mapping executor includes a mapping unit for handling a mapping between one of the elements and the corresponding attribute.

39. The manager as claimed in claim 28, wherein the markup language document has one or more elements, the object model has one or more object classes, each object class has one or more attributes, the attributes include an attribute representing a relationship between the objects, the mapping executor includes a relationship mapping unit for handling a mapping of a relationship between the objects, and the relationship represents a relation between the elements.

40. The manager as claimed in claim 28, wherein the object model has one or more object classes, each object class has one or more attributes, and the mapping executor includes a mapping unit for creating one or more elements corresponding to the attributes by inserting values of the attributes based on the mapping meta-data.

41. The manager as claimed in claim 28, wherein the markup language document is a document in which each element is defined by indicators.

42. The manager as claimed in claim 41, wherein the markup language document is an XML document.

43. A mapping system for mapping between a markup language document and an object model, the mapping system comprising:
   an executor for receiving a mapping request for mapping between a markup language document having data architecture and an object model, wherein the mapping request includes a key for identifying the markup language document;
   a storage for storing mapping meta-data which defines how the data architecture of the markup language document maps to the object model; and
   a mapping executor for directly mapping, in response to the mapping request, between data of the markup language document and an object of the object model using the mapping meta-data, wherein the mapping step obtains the markup language document using the key;

wherein mapping the data in the markup language document directly into the object model using the mapping meta-data enables the mapping executor to support inheritance or relationships in the object model.

44. The system as claimed in claim 43 wherein the mapping executor includes a mapping unit for obtaining the mapping meta-data from the storage.

45. The system as claimed in claim 43, wherein the mapping storage obtains the mapping meta-data prior to an operation of the mapping executor.

46. The system as claimed in claim 43, wherein the mapping storage obtains the mapping meta-data during initialization of the system.

47. The system as claimed in claim 43 further comprising a runtime interface to accept the mapping request from an application.

48. The system as claimed in claim 43, wherein the markup language document has one or more elements, the object model has one or more object classes, the object class has one or more attributes, and the mapping executor includes a mapping unit for populating the attributes with the data associated with the elements based on the mapping meta-data.

49. The system as claimed in claim 43, wherein the object model has one or more object classes, each object class has one or more attributes, and the mapping executor includes a mapping unit for creating one or more elements corresponding to the attributes by inserting values of the attributes based on the mapping meta-data.

50. The system as claimed in claim 43, wherein the markup language document is a document in which each element is defined by indicators.

51. The system as claimed in claim 50, wherein the markup language document is an XML document.

52. Computer readable media storing the instructions or statements for use in the execution in a computer of a method for mapping between a markup language document and an object model, the method comprising the steps of;

receiving a mapping request for mapping between a markup language document and an object model, wherein the mapping request includes a key for identifying the markup language document, wherein the mapping between the markup language document and the object model includes:

mapping data in the markup language document having data architecture into an object model; and mapping one or more objects in an object model into a markup language document;

mapping, in response to the mapping request, either the data directly into the object model, or the objects directly into the markup language document, using mapping meta-data which defines how the data architecture of the markup language document maps to the object model, wherein the mapping step obtains the markup language document using the key;

wherein mapping the data in the markup language document directly into the object model using the mapping meta-data enables the method to support inheritance or relationships in the object model.

53. A computer program product for use in the execution in a computer of a method for mapping between a markup language document and an object model, the computer program product comprising:

a module for receiving a mapping request for mapping between a markup language document and an object model, wherein the mapping request includes a key for identifying the markup language document, wherein the mapping between the markup language document and the object model includes: mapping data in the markup language document having data architecture into an object model; and mapping one or more objects in an object model into a markup language document;

a module for mapping, in response to the mapping request, either the data directly into the object model, or the objects directly into the markup language document, using mapping meta-data which defines how the data architecture of the markup language document maps to the object model, wherein the mapping step obtains the markup language document using the key;

wherein mapping the data in the markup language document directly into the object model using the mapping meta-data enables the module for mapping to support inheritance or relationships in the object model.

* * * * *

UNITED STATES PATENT AND TRADEMARK OFFICE
CERTIFICATE OF CORRECTION

PATENT NO. : 7,089,533 B2 Page 1 of 1
APPLICATION NO. : 09/920786
DATED : August 8, 2006
INVENTOR(S) : Brian Vosburgh It is certified that error appears in the above-identified patent and that said Letters Patent is hereby corrected as shown below:

On the title page item [73]:

In the Assignee Name (on page 1), please delete "OIC Acquisition I Corporation".

In the Assignee Name (on page 1), please insert --Oracle International Corporation--.

Signed and Sealed this

Nineteenth Day of August, 2008

JON W. DUDAS
*Director of the United States Patent and Trademark Office*